United States Patent
Domschot (10) Patent No.: US 9,040,874 B2
(45) Date of Patent: May 26, 2015

(54) MODULAR WELDING EQUIPMENT

(75) Inventor: Bryan W. Domschot, Blissfield, MI (US)

(73) Assignee: Tec-Option, Inc., Blissfield, MI (US)

( * ) Notice: Subject to any disclaimer, the term of this patent is extended or adjusted under 35 U.S.C. 154(b) by 2108 days.

(21) Appl. No.: 11/944,843

(22) Filed: Nov. 26, 2007

(65) Prior Publication Data

US 2008/0072646 A1  Mar. 27, 2008

Related U.S. Application Data

(62) Division of application No. 10/988,880, filed on Nov. 15, 2004, now Pat. No. 7,309,845.

(60) Provisional application No. 60/520,062, filed on Nov. 15, 2003.

(51) Int. Cl.
*B23K 9/32* (2006.01)
*B23K 11/36* (2006.01)
*B23K 37/02* (2006.01)

(52) U.S. Cl.
CPC . *B23K 9/32* (2013.01); *B23K 11/36* (2013.01); *B23K 37/0294* (2013.01)

(58) Field of Classification Search
USPC ...................... 219/86.24, 86.25, 86.8, 87, 158
See application file for complete search history.

(56) References Cited

U.S. PATENT DOCUMENTS

| | | | |
|---|---|---|---|
| 3,148,264 A | 9/1964 | Van Alan Clark, Jr. et al. | |
| 3,970,232 A | 7/1976 | Melton | |
| 4,473,734 A | 9/1984 | Henry | |
| 4,582,979 A | 4/1986 | Moerke | |
| 4,594,494 A | 6/1986 | Henry et al. | |
| 4,763,799 A | 8/1988 | Cohn et al. | |
| 4,893,398 A | 1/1990 | Zimmer | |
| 5,093,977 A | 3/1992 | Muller et al. | |
| 5,438,938 A * | 8/1995 | Meeker et al. ................... | 108/91 |
| 5,763,850 A | 6/1998 | Hardt | |
| 5,831,234 A | 11/1998 | Nakamura et al. | |
| 6,013,891 A | 1/2000 | Stempfer | |
| 6,072,146 A | 6/2000 | Matuschek et al. | |
| 6,271,496 B1 | 8/2001 | Domschot | |
| 6,279,224 B1 | 8/2001 | Wirtz et al. | |
| 6,512,195 B2 * | 1/2003 | Domschot ................... | 219/86.25 |
| 2002/0011470 A1 * | 1/2002 | Domschot .................... | 219/86.8 |

\* cited by examiner

*Primary Examiner* — Brian Jennison
(74) *Attorney, Agent, or Firm* — Reising Ethington P.C.

(57) ABSTRACT

Welding equipment that includes a tooling cart for transferring interchangeable tooling modules to a welding machine. A latch is mounted to the welding machine for latching the tooling cart to the welding machine, and a latch is provided for latching the tooling modules onto the tooling cart. A two-piece tooling cart includes a removable upper section for securing tooling modules thereto and a reusable lower section for use with other tooling modules. A welding method permits operation of a welding machine using a user interface that permits modular programming of at least one operational sequence of welding machine valves and weld operations for a variety of different tooling modules. An operator inputs a new sequence of operations using the user interface rather than having to rewrite ladder logic just to switch over the welding machine to use with a different tooling module.

10 Claims, 6 Drawing Sheets

| < | Sequence # | > | Exit |
|---|---|---|---|
| Valve On | # | | |
| Delay Time | | #.## | |
| Valve On | # | | |
| Delay Time | | #.## | |
| Input ON | ## | | |
| Input ON | | ## | |
| Weld Sch. | ## | | |
| Valve OFF | | # | |
| Delay Time | #.## | | |
| Valve OFF | | # | |
| Delay Time | #.## | | Save Seq. |
| More=1, Done=0 | | # | |

Figure 12

MODULAR WELDING EQUIPMENT

CROSS-REFERENCE TO RELATED APPLICATION

This application is a divisional of U.S. Ser. No. 10/988,880, filed Nov. 15, 2004, which claims the priority of U.S. Provisional Application No. 60/520,062, filed Nov. 15, 2003. The complete disclosures of these two prior applications are hereby incorporated by reference.

FIELD OF THE INVENTION

This invention relates to welding equipment of the type used in manufacturing plants for production of welded parts. More particularly, it relates to electric welding machines, such as resistance welders and metal-inert gas (MIG) welders, and related equipment.

BACKGROUND OF THE INVENTION

It has been a common practice in the welding machine industry to build welding machines with custom tooling as an integral part of the welding machine. In this practice, especially in connection with resistance and MIG welding machines, each machine is dedicated to the manufacture of a particular part and is not useable for manufacture of other parts. The working area of such a dedicated machine includes an attached assembly of fixtures and tools specifically made, located and adjusted to produce the parts to which the machine is dedicated. The entire machine, from heavy frame to built-in precision fixtures is treated as capital equipment on the financial books of the purchaser. When the parts produced by the dedicated machine are no longer needed, the entire machine is generally scrapped.

Previously, there had been a longstanding need in the industry to overcome the disadvantages which accompany the practice of using dedicated welding machines such as the economic loss from scrapping the entire machine when the tools and fixtures are no longer usable because of wear and tear or because of termination of production of the part to which the machine is dedicated. A general solution to this problem is disclosed in U.S. Pat. No. 6,512,195 which discloses an electric welding machine that has a base operating machine which can accept different tooling modules so that only the tooling module and not the entire welding machine can be replaced when switching between different welding programs or operations.

In the welding machine of the U.S. Pat. No. 6,512,195 patent, the tooling module can be transferred to and from the base operating machine from a module transfer cart, or tooling cart, that is useful in transporting and storing the tooling module when not in use. To connect a particular tooling module to the base operating machine for use in welding parts, the tooling cart containing the tooling module is wheeled up to the base operating machine. A pair of alignment pins on the tooling cart engage and insert into corresponding alignment sockets on the base operating machine. This helps insure proper alignment of the cart and base operating machine so that the tooling module can be slid off the cart and onto the base operating machine. Although this arrangement provides vertical and lateral alignment of the tooling cart and base operating machine, it still allows for relative movement of the tooling cart toward and away from the base operating machine during tooling module transfer. Additionally, this arrangement does not provide any means for positively latching the tooling module to the tooling cart to maintain the tooling module in place and prevent the tooling module from shifting on the cart as the tooling cart is moved. When a particular tooling module is not in use on a base operating machine, it is typically stored on a tooling cart until needed. This enables easy transportation and storage of the tooling module without requiring heavy lifting equipment. However, this arrangement does require a dedicated cart for each tooling module.

When switching between tooling modules, new control programming is typically required for the welding machine. As is known, welding machines typically include a programmable logic controller (PLC) that is programmed to carry out one or more specific welding sequences in which the PLC controls operation of both the welding controller and the various solenoid valves used to drive pneumatic cylinders or other actuators that load, manipulate, weld, and unload a part. Programming of the PLC has typically been done using ladder logic, with a separate set of ladder logic being written and loaded into the PLC for each different tooling module used.

It is a general object of this invention to improve upon some of the features of the modular welding machines discussed above.

SUMMARY OF THE INVENTION

In accordance with one aspect of this invention, there is provided modular welding equipment that comprises (i) a welding machine having a base operating machine and a tooling module supported by the base operating machine, (ii) a tooling cart engageable with the welding machine, and (iii) a tooling cart latch that includes a first latch member on the base operating machine and a second latch member on the tooling cart. The tooling cart can be used to transport one of a number of different tooling modules to and from the base operating machine. During loading and unloading of a tooling module on and off the base operating machine, the tooling cart can be latched to the base operating machine by engagement of the latch members. In this way, relative movement between the tooling cart and base operating machine is inhibited during loading and unloading of the tooling module.

In accordance with another aspect of the invention, there is provided a tooling cart for use with a tooling module, wherein a tooling module latch is provided to secure the tooling module on the cart during transportation and storage of the tooling module. The tooling module latch preferably is designed so that the tooling module can only be unlatched when the tooling cart is connected in position to the base operating machine.

According to another aspect of the present invention, a welding tooling cart is provided which includes a reusable lower section having a base and wheels along with a separate, upper section that includes a frame for supporting the tooling module. The lower section includes a plurality of locators and the upper section aligns with and fits over the locators. Then, when a particular tooling module is not currently in use, it can be stored on the upper section of the cart which is removed from the wheeled base so that the lower section can be re-used with another upper section and tooling module.

According to yet another aspect of this invention, there is provided a method of operating a welding machine using a user interface that permits modular programming of one or more operational sequences of welding machine valves and weld operations for a variety of different tooling modules. The method facilitates switching over to a different tooling module wherein an operator inputs a new sequence of operations using the user interface rather than rewriting ladder logic.

A complete understanding of this invention may be obtained from the detailed description that follows taken with the accompanying drawings.

DETAILED DESCRIPTION OF THE PREFERRED EMBODIMENTS

The description that follows will set forth the best mode for carrying out the invention by describing illustrative embodiments of the inventive modular welding machine as presently contemplated. This invention is especially adapted for use with electric welding machines of all types, but can be used in conjunction with other types of welders. This disclosure relates to various improvements to the modular welding machine disclosed in U.S. Pat. No. 6,512,195, which is assigned to the assignee hereof and which is incorporated by reference herein in its entirety. It will be appreciated as the description proceeds that the invention is useful in a wide variety of applications and may be realized in many different embodiments.

Figure 1:
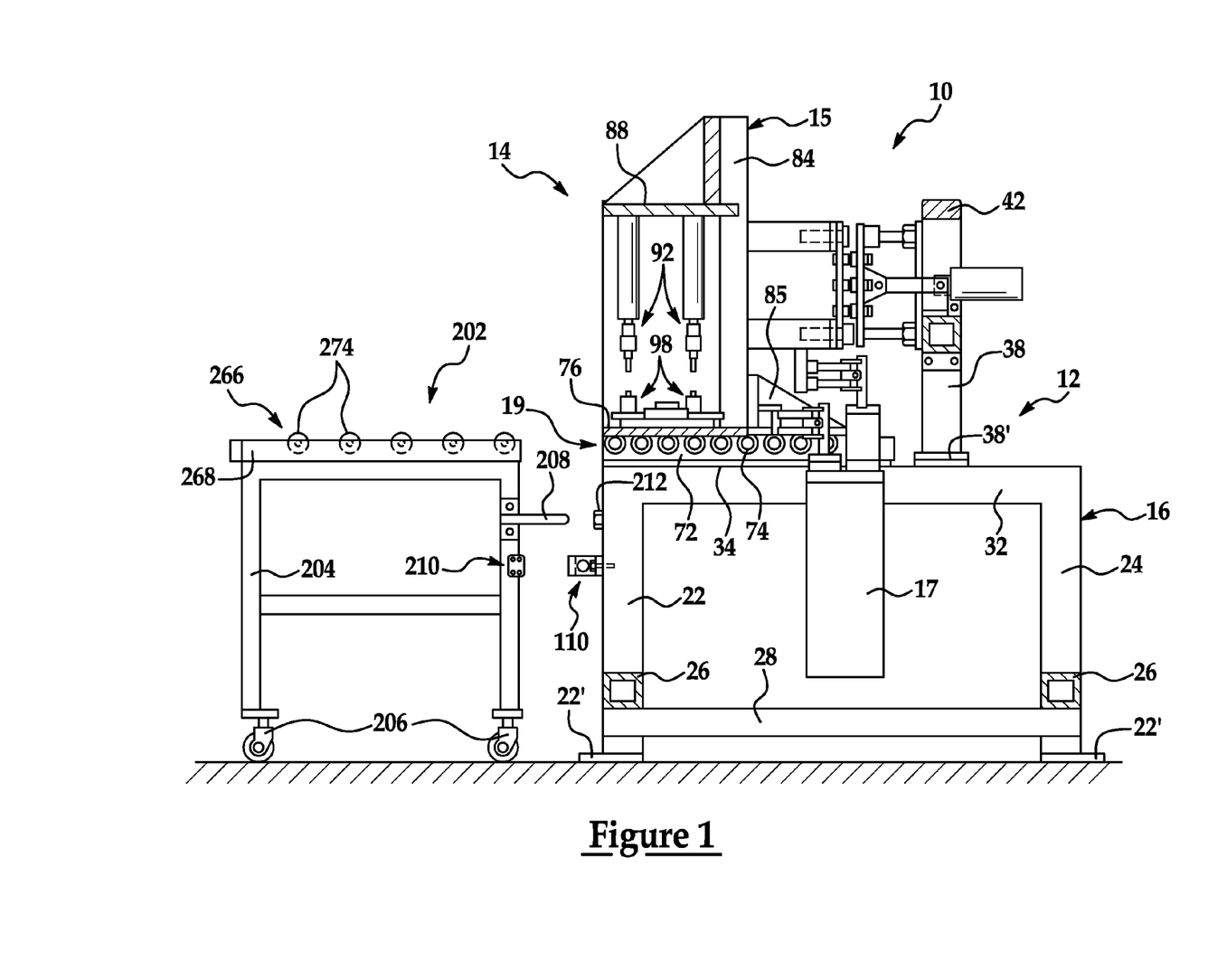
FIG. 1 is a side elevation view of welding equipment including a tooling cart for loading a tooling module into a welding machine, according to an exemplary embodiment of this invention.
Figure 2:
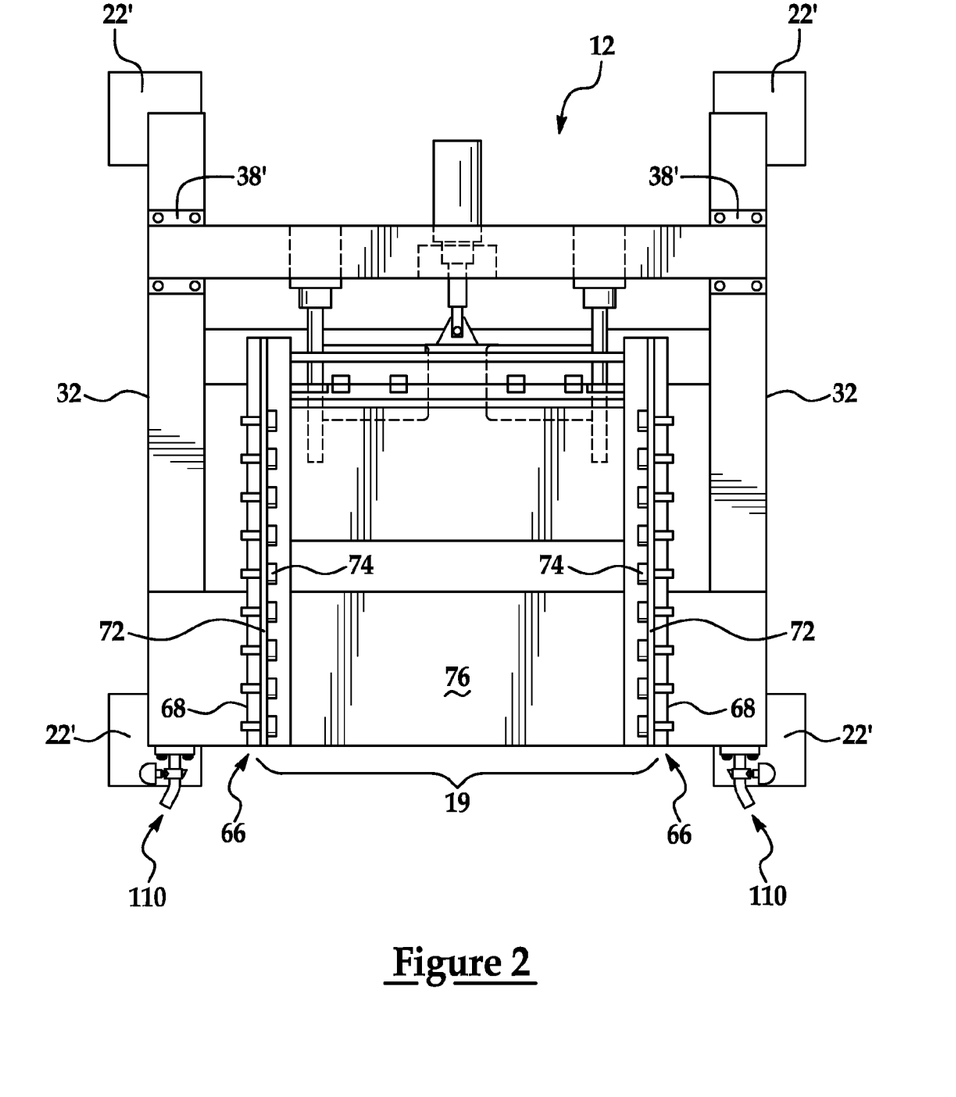
FIG. 2 is a top plan view of the welding machine of FIG. 1.
Figure 3:
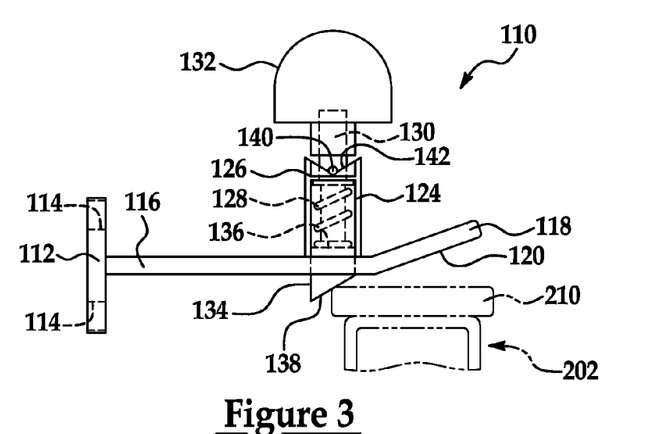
FIGS. 3 through 5 are top plan views illustrating a portion of the tooling cart being engaged with the welding machine of FIG. 1 via a latch.

Referring now to FIGS. 1 and 2, an exemplary embodiment of modular welding equipment according to this invention includes a welding machine 10, which is a resistance welder of the spot welding type. The welding machine 10 comprises, in general, a base operating machine 12 and a tooling module 14 shown in its installed location in the base operating machine 12. The base operating machine 12 comprises, in general, a machine frame 16, and at least one welding transformer 17. The tooling module 14 comprises a module frame 15 which supports the tooling components required for a particular welding job or product which is to be run on the machine 12.

The tooling module 14 is installed in the machine 12 as a unit and is removable as a unit as needed for maintenance, repair or for replacement by another tooling module. The tooling module 14 is adapted for a specific job only and several different tooling modules may be kept in standby condition which are tooled for particular production jobs which may be needed in the future. The base operating machine 12 and the tooling module 14 will be described in greater detail below.

The machine frame 16 comprises a table structure that includes a tooling module station at an upper location on the machine frame 16. The tooling module station receives the tooling module 14 and, for this purpose, includes a module support guide or rack 19 that enables the tooling module to be rolled into and out of the tooling module station. The table structure includes front legs 22 with shoe plates 22', rear legs 24, cross beams 26, front to rear longitudinal beams 28 and upper longitudinal beams 32. A table plate 34 is supported on the upper longitudinal beams 32. A pair of oppositely disposed rear posts 38 extend upwardly from bolt plates 38' mounted on the longitudinal beams 32. A support beam 42 extends transversely of the frame 16 between posts 38.

The base operating machine 12 includes the support rack 19 for supporting the tooling module 14, wherein the support rack 19 comprises the table plate 34 and guide means or a roller guide 66. The guide means 66 comprises a pair of rails 68 which extend parallel with each other in the front to rear direction of the machine frame 16. Each rail 68 includes a flange plate 72 mounted on the inner side of the rail 68 and each rail 68 also includes a plurality of rollers or roller bearings 74 having a stationary shaft extending through the flange plate 72 and rail 68 and secured thereto. The rails 68 are spaced apart laterally so that a bottom plate 76 of the module 14 is supported on the two sets of rollers 74 and retained in a centered position between the flange plates 72. The rails 68 facilitate the removal and installation of the tooling module 14 in the base operating machine 12.

The tooling module 14 comprises the module frame 15 which includes the bottom plate 76 with a pair of vertical posts 84 supported thereon in laterally spaced arrangement. Lower triangular brackets 85 support the vertical posts 84 on the bottom plate 76. The posts 84 together with triangular brackets 86 support a top plate 88 which is located above the bottom plate 76. The upper tooling is mounted to the top plate 88 and comprises a pair of weld guns 92. The lower tooling of the module 14 comprises a pair of electrodes 98, which are supported on the bottom plate 76.

In order to facilitate the installation and removal of the tooling module 14 from the base operating machine 12, a tooling cart or module transfer cart 202 is provided as shown in an unlatched location in FIG. 1. The cart 202 is part of the welding equipment described herein and comprises a rectangular frame 204 which is mounted on a set of casters 206. For supporting the tooling module 14 on the cart 202, a guide means or roller guide 266, which comprises rails 268, side plates and roller bearings 274 mounted on the top of the frame 204 in the same manner as described with reference to the guide means 66 in the support rack 19 of the welding machine 10. The forward end of the cart 202 is provided with a pair of alignment pins 208 which extend forwardly from the front of the cart frame 204. A pair of alignment sockets 212 are disposed on the machine frame 16 which are aligned for coaction with the pins 208 when the cart 202 is positioned so that the guide rails 268 on the cart 202 are in alignment with the guide rails 68 on the support rack 19. When the cart 202 is positioned so that the pins 208 are fully inserted into the sockets 212, the tooling module 14 is manually pushed off the cart 202 from its uninstalled location, onto the support rack 19 on the base operating machine 12 to its installed position or location.

A tooling cart latch is used to secure the tooling cart 202 in a latched location with respect to the base operating machine 12. In the illustrated embodiment, two latches are used, each of which includes a latch plate 210 that is mounted on the vertical front frame members of the cart 202 and a latch 110 that is attached to the base operating machine 12 at one of the two tubular frame members or front legs 22. Thus, when the cart 202 is wheeled up to the machine 12 to transfer a tooling module 14 to or from the cart 202, the cart 202 will move into engagement with the latches 110 to lock the cart 202 in proper positioning against the base operating machine 12 in its latched location. As will be described in further detail below, the latches 110 each include a spring loaded first latch member that engages its associated latch plate 210 to secure the cart in place. However, it is also contemplated that the latches 110 could also cooperate directly with a different portion of the tooling cart 202 such as the frame thereof or some other feature besides the latch plates 210.

The two latches 110 can be identical, the only difference being that one is inverted when being bolted to the base operating machine 12, as indicated in FIG. 2. Accordingly, only one latch 110 will be described and it will be appreciated that the description applies equally to both latches 110.

Figure 6:
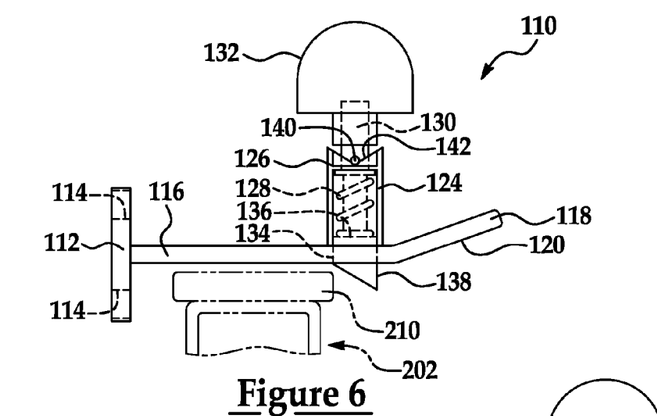
FIGS. 6 and 7 are top plan views illustrating the portion of the tooling cart being disengaged from the welding machine of FIG. 1.
Figure 7:
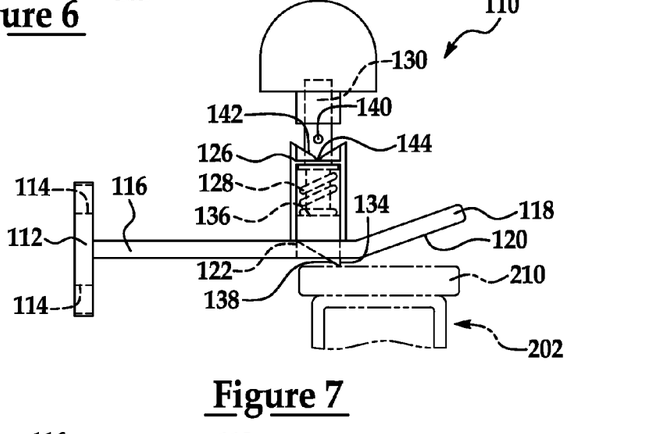
Figure 8:
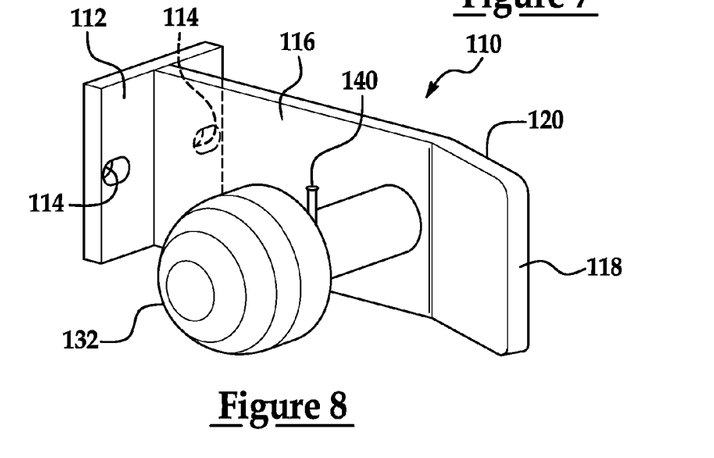
FIG. 8 is a front perspective view of the latch of FIGS. 3 through 5.
Figure 9:
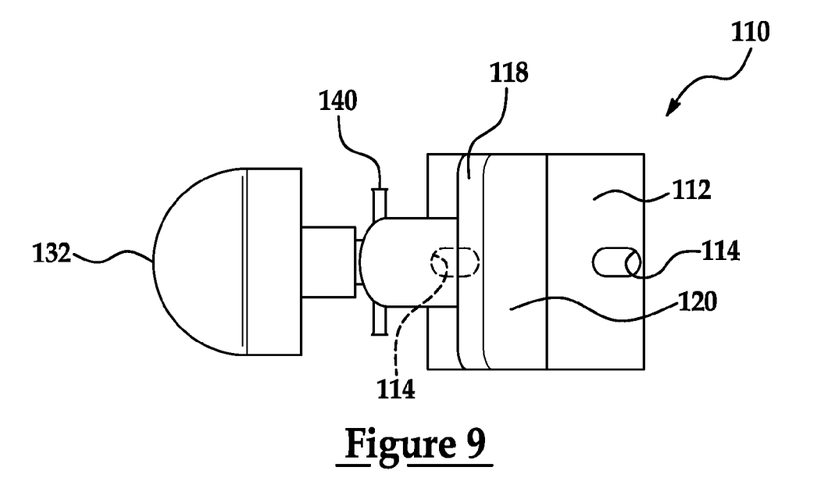
FIG. 9 is a front view of the latch of FIGS. 3 through 5.

FIGS. 3 through 7 depict top views of the latch 110 as it would be oriented when mounted on the base operating machine 12 and FIGS. 8 and 9 provide perspective and front views, respectively, of the latch 110. The latch 110 is attached via its mounting plate 112 that includes two or more clearance holes 114 through which bolts (not shown) are placed to fasten it to the framework of the base operating machine frame 16. Any other suitable means could be used to attach the latch 110 to the machine frame 16. Extending generally perpendicularly from the mounting plate 112 is a bracket 116 in the form of a flat plate having an end section 118 that is bent or angled out of the plane of the remainder of the bracket 116. This provides a guide surface 120 to center the cart 202 as it approaches the base operating machine 12 from its unlatched location so that the cart 202 need not be in perfect alignment as it is brought into contact with the machine 12 into its latched location. This can also help achieve alignment of the pins 208 of the cart 202 with the sockets 212 or can eliminate the need for the alignment pins 208 and sockets 212 altogether.

The bracket 116 includes an aperture or hole 122 at a central location near the bend in the bracket 116 that defines the angled end section 118. On the side of the bracket 116 opposite the guide surface 120 side is a spring housing 124 that is welded, threaded, press-fit, or otherwise rigidly attached to the bracket 116 about the hole 122 (i.e. substantially concentric with the hole 122). The spring housing 124 is basically a hollow component that has a cylindrical shape with a back wall 126 that serves to retain a spring 128 within the housing 124. The spring 128 is a helical compression spring mounted on a shaft 130 that extends through the housing 124. The shaft 130 is connected at one end to a handle 132 or knob and at the other end to a cylindrical end piece or head 134 located within the hole 122 in the bracket 116. It is contemplated that the shaft 130 and head 134 could be one integral component instead of being separately attached and such arrangements are equivalent. The head 134 has a back surface or shoulder 136 against which the spring 128 presses to force the shaft 130 and head 134 outwardly through the hole 122 in the bracket 116. The head 134 also includes an angled bearing surface 138 at its exposed or free end. Extending perpendicularly through the shaft 130 near the knob 132, and between the spring housing 124 and the knob 132, is a pin 140 that extends transversely through a portion of the shaft 130 and engages a cam surface 142 at the free end of the spring housing 124. The spring 128 operates to bias the head 134 and shaft 130 outwardly of the spring housing 124 in an inboard direction so that the angled bearing surface 138 is positioned beyond or inboard of the hole 122 in the bracket 116 at an exposed location. The extent of movement of the head 134 and shaft 130 in this biased direction is limited by engagement of the pin 140 with a detent 144 in the cam surface 142. Thus, the head 134 and shaft 130 are spring loaded, with these components being movable against the spring bias by pulling on the knob 132.

Figure 4:
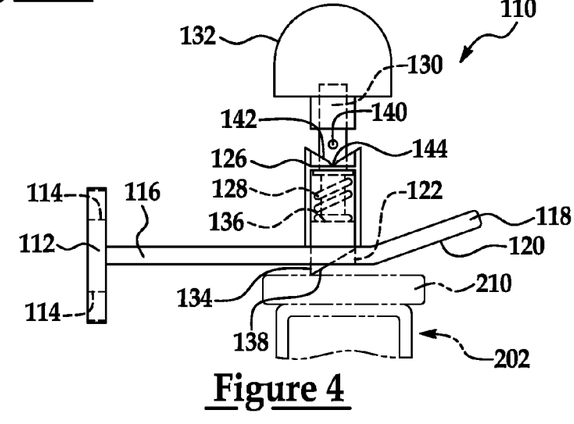
Figure 5:
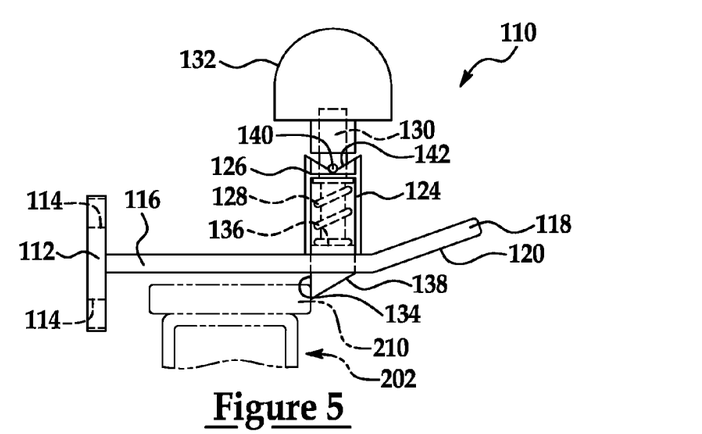

As shown in FIGS. 4 and 5, in use, when the cart 202 is moved up to the base operating machine 12 from its unlatched location to its latched location, the latch plates 210 mounted on the cart 202 engage the angled bearing surfaces 138 of the heads 134 of the latches 110 as the cart 202 is advanced toward and eventually into contact with the machine 10. This causes the head 134 and shaft 130 to retract against the bias of the spring 128, as shown in FIG. 4. Once the cart 202 has been moved fully into engagement with the machine 12, the latch plate 210 moves past the head 134, allowing it to spring back to its original position, and thereby latching the cart 202 in place against the machine, as shown in FIG. 5. The tooling module 14 can then be transferred between the cart 202 and machine 16.

Referring now to FIG. 6, when the operator is ready to remove the cart 202 from the machine 10, the latch 110 is released by pulling the knob 132 and turning it 180° so that the angled bearing surface 138 now faces the opposite direction. As the cart 202 is pulled away from the machine 10, the latch plate 210 again engages the angled bearing surface 138, forcing the head 134 and shaft 130 to move outwardly while the cart 202 is removed. This is shown in FIG. 7. The knob 132 can then be rotated back to its original position so that it will be properly positioned for whenever the cart 202 is again used for transferring another tooling module. As will be appreciated, the V-shaped profiled cam surface 142 and detent 144 shown in these figures allows the angled bearing surface 138 to be maintained in either of the two 180° orientations.

Figure 10:
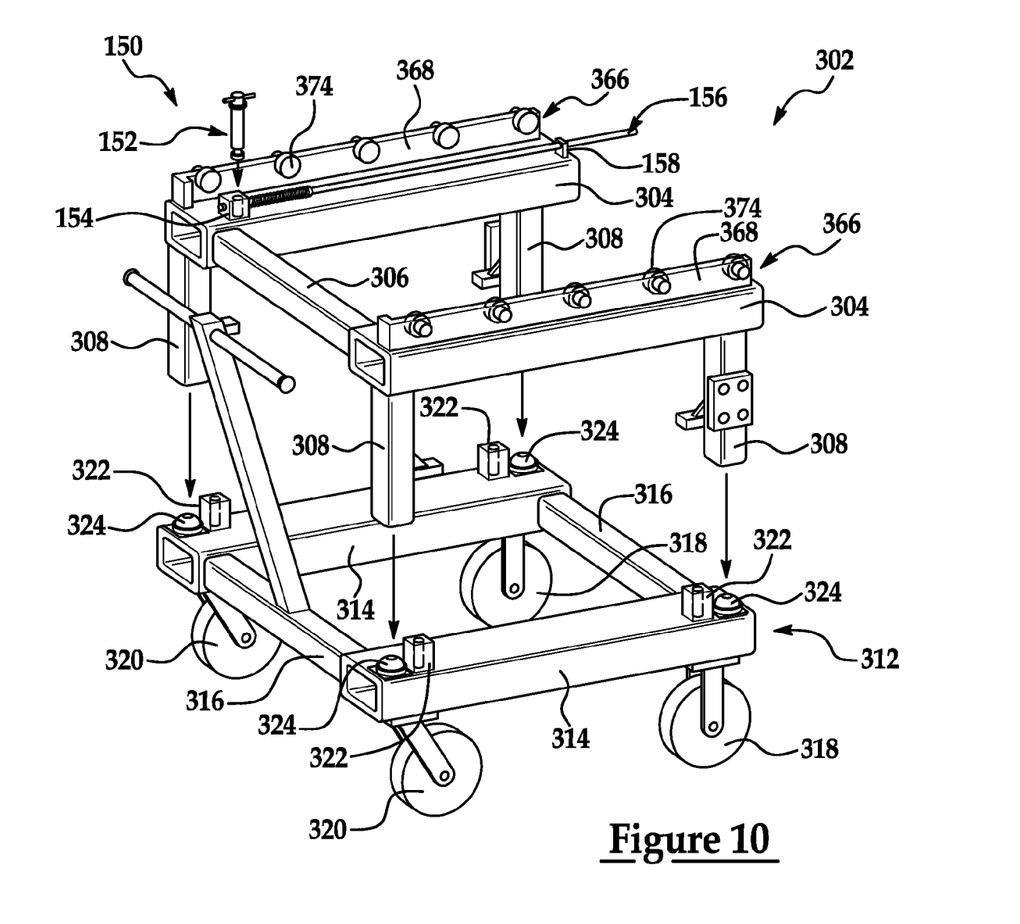
FIG. 10 is an exploded perspective view of a two-piece tooling cart according to another exemplary embodiment of the present invention.
Figure 11:
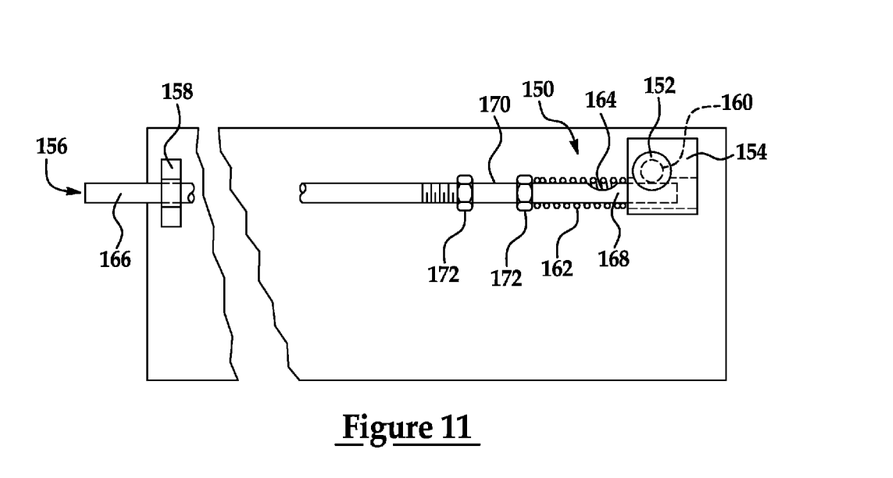
FIG. 11 is an enlarged top plan view of a portion of the tooling cart of FIG. 10.

Referring now to FIGS. 10 and 11, there is shown another embodiment 302 of the tooling cart in which it includes a safety tooling module latch 150 to prevent the tooling module (14 of FIG. 1) from being moved off a tooling cart 302 unless and until the tooling cart 302 is properly positioned at the base operating machine 12. The tooling cart 302 can be similar to the tooling cart 202 of FIG. 1, except as described below. When the tooling module (not shown) is situated on top of the cart 302, a module latch member such as a locating pin or shot pin 152 is used to latch it to the cart 302 to prevent the tooling module 14 from rolling off of the cart 302. The shot pin 152 is dropped down through a hole (not shown) in the tooling module base plate or frame (not shown), and this shot pin 152 extends longitudinally in a vertical direction into a vertically extending passage of a shot pin block 154 on the cart 302 where it is latched. Until this pin 152 is unlatched, it cannot be removed and the tooling module cannot therefore be rolled off the cart 302. The shot pin 152 is latched using a cart latch member of the tooling module latch 150 such as a probing rod 156, which extends forward of the cart 302 and is spring loaded into the position shown in FIG. 10 in a transversely extending passage of the block 154.

The probing rod 156 is mounted on a frame member such as a rectangular upper fork lift tube 304 of the cart 302. In its biased position as shown, the rod 156 extends through a mounting block 158 and into the shot pin block 154 wherein the rod 156 selectively engages an engagement recess such as a reduced diameter groove 160 of the shot pin 152 which is shown in FIG. 11. With the probing rod 156 transversely extending with respect to and engaging the shot pin 152 in this groove 160, the shot pin 152 cannot then be removed due to the interference or engagement between the probing rod 156 and end portion of the shot pin 152.

With reference to FIG. 11, when the cart 202 is brought into engagement with the welding machine (10 in FIG. 1), the probing rod 156 engages a portion of the machine 10, such as the machine frame 16, and is pushed backwards against the bias force of a spring 162. The probe rod 156 continues moving backwards through the shot pin block 154 until the cart 302 is properly in its latched position at the machine 10 (e.g., using the tooling cart latch discussed in connection with FIGS. 1-9). At this point, a disengagement recess 164 in the probing rod 156 will be substantially adjacent and aligned with the vertical passage and shot pin 152 in the shot pin block 154 so that there is no longer any interference or interengagement of the probing rod 156 with the shot pin 152, and the shot pin 152 can therefore be removed to thereby unlatch the tooling module. As shown in FIG. 11, the probing rod 156 may be an assembly of two separate rods 166, 168 coupled together with a coupling nut 170 and jam nuts 172 on either end thereof to provide a shoulder against which the spring 162 locates. Alternatively, however, it is contemplated that a single rod could be used with an integral annular flange or a circlip fastener or the like to provide a shoulder for cooperating with the spring 162.

Typically, tooling modules are stored on their associated cart 302 when not in use. Rather than storing them on an entire cart, such that one full cart (including casters and all) is needed for each tooling module, the cart 302 can be made in two sections, as shown in FIG. 10. An upper portion or section has a framework including laterally opposed forklift tubes 304 for supporting roller guide 366 including its guide rails 368 and rollers 374. The upper section also includes a laterally extending cross-member 306, which connects rear ends of the fork tubes 304, and downwardly extending tubular legs 308 at each of the four corners of the cart 302. A lower portion or section of the cart 302 includes a cart base 312 or truck, which has its own framework including laterally opposed and longitudinally extending forklift tubes 314 and longitudinally opposed and laterally extending cross-members 316. The base 312 also includes fixed casters 318, swivel casters 320, and levelers 322, as well as locators 324 at each of the four corners. The locators 324 are preferably semi-spherical in shape and are aligned with and easily mate with the open ends of the tubular legs 308 of the upper section so that the upper section normally sits on the cart base 312 and stays in place due to its weight, but can be lifted up off the cart base 312. As such, open ends of the tubular legs 308 act as female locators for cooperating with the base locators 324 which fit partially up into the tubular legs 308. This arrangement permits the tooling module to be left on the upper cart section so that it can be stored in this manner on the upper section, while the cart base 312 is then available for use with other tooling modules and upper cart sections (not shown).

Those of ordinary skill in the art of welding machine technology recognize that the operation of welding machines is often controlled using a programmable logic controller (PLC). Each tooling module operates under program control provided by the programmable logic controller (PLC), wherein a stored computer program is provided in the PLC corresponding to each different tooling module. When a module is installed in the base operating machine, the program for running the module may be manually selected by the operator by a program selector in a control cabinet of the machine (not shown). In the past, programming of the PLC has typically been done using ladder logic, with the PLC controlling operation of both the welding controller and the various solenoid valves used to drive pneumatic cylinders or other actuators that load, manipulate, weld, and unload a part. For each different tooling module used, a separate set of ladder logic is written and loaded into the PLC. However, for the welding machine 10 of the disclosed embodiment, an improved operator interface is provided which presents the operator with a simplified user interface that permits programming of the necessary sequencing of valves and weld operations to accomplish the required task for any particular tooling module. Thus, when switching over to a different tooling module, new ladder logic need not be specifically written for the new tooling module, but rather, just a new sequence of operations using the interface.

Figure 12:
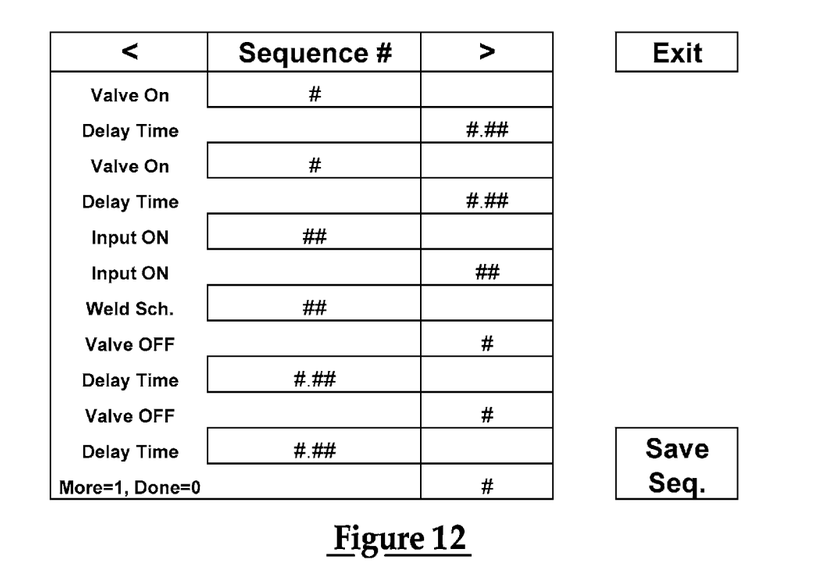
FIG. 12 depicts an exemplary screen display for use in inputting welding sequences into the welding machine of FIG. 1.

As described with respect to the welding machine of the incorporated U.S. Pat. No. 6,512,195, the PLC can be a Nematron™ PTC5800 and the HMI can be a Nematron™ 5.7 inch touchscreen, both of which are available from Nematron Corporation of Ann Arbor, Mich., USA (www.nematron.com). The HMI touchscreen is used by the machine operator to input the sequencing of operations for a particular tooling module. An exemplary touchscreen input display is shown in FIG. 12. It is through this user interface that the operator can define the proper sequencing of valve and welding operations for the tooling unit without having to write direct ladder logic for the PLC.

Any given overall welding cycle (or Auto Cycle) consists of a number of sequences that can be entered by the operator through the touchscreen user interface. For example, the welding machine might permit up to eight sequences for a single welding cycle in which case eight of these sequence definition screens would be filled out by the operator. The sequence number (1-8) may be displayed at the top, center of the touchscreen, and on either side of this are previous and next buttons to allow the operator to move forward or backward through the sequences. For each sequence, there are eleven possible command and data entries, with a twelfth entry at the bottom used to specify whether there are more sequences to enter or whether the operator is done with the welding cycle definition. The programming of each of these twelve entries is as follows in accordance with an exemplary method of the present invention:

Step one: Select "Valve On" command (range: 0-7); each number corresponds to a solenoid valve on the base machine. This valve could control a pneumatic cylinder on the tooling module such as a weld cylinder, weld cylinder slide, clamp cylinder, locate cylinder, unload part cylinder. Enter 0 if no command is used. The master PLC program will check that all machine inputs and outputs are okay to start and continue machine cycle.

Step Two: Select "Delay Timer" command (range: 0.0 to 3.00 sec.); this timer is the delay between the "Valve On" above this command and the "Valve On" below this command. Enter 0 if no delay is used.

Step Three: Select "Valve On" command (range: 0-7); each number corresponds to a solenoid valve on the base machine. This valve could control a pneumatic cylinder on the tooling module such as a weld cylinder, weld cylinder slide, clamp cylinder, locate cylinder, unload part cylinder. Enter 0 if no command is used.

Step Four: Select "Delay Timer" command (range: 0.0 to 3.00 sec.); this timer is the delay between the "Valve On" above this command and the "Valve On" below this command. Enter 0 if no delay is used.

Step Five: Select "Input On" and enter input (range: 0-16) that is required to be "on" at this point in the sequence. The master PLC program will check for this input to go on and off each auto cycle. Enter 0 if input check is not desired at this point in Auto Cycle.

Step Six: Select "Input On" and enter input (range: 0-16) that is required to be "on" at this point in the sequence. The master PLC program will check for this input to go on and off each auto cycle. Enter 0 if input check is not desired at this point in Auto Cycle.

Step Seven: Select "Weld Such." and enter the weld schedule number (range: 0-63) that is required for this weld. The master PLC program will turn on the binary select, weld enable, and initiate weld outputs that interface with the weld controller. It will also confirm the weld complete signal from the weld controller. Enter 0 if no weld is desired at this point in Auto Cycle.

Step Eight: Select "Valve Off" command (range: 0-7); each number corresponds to a solenoid valve on the base machine. This valve could control a pneumatic cylinder on the tooling module such as a weld cylinder, weld cylinder slide, clamp cylinder, locate cylinder, unload part cylinder. Enter 0 if no command is used.

Step Nine: Select "Delay Timer" command (range: 0.0 to 3.00 sec.); this timer is the delay between the "Valve Off" above this command and the "Valve Off" below this command. Enter 0 if no delay is used.

Step Ten: Select "Valve Off" command (range: 0-7); each number corresponds to a solenoid valve on the base machine. This valve could control a pneumatic cylinder on the tooling module such as a weld cylinder, weld cylinder slide, clamp cylinder, locate cylinder, unload part cylinder. Enter 0 if no command is used.

Step Eleven: Select "Delay Timer" command (range: 0.0 to 3.00 sec.); this timer is the delay between the "Valve Off" above this command and the "Valve Off" below this command. Enter 0 if no delay is used.

Step Twelve: Select "More=1, Done=0"; Enter 1 to choose to have this sequence linked to the next sequence to follow. Enter 0 to choose to "End" the Auto Sequence. The master PLC program will complete the auto cycle, counters will display completed part in batch counter, tip counters, and master counter. Selecting a "Save Seq." button saves changes to the master PLC program memory for each sequence.

The programming of the HMI and PLC needed to provide these display screens and receive the input and use it to control the welding machine in the desired manner is routine and all within the level of skill in the art.

It will thus be apparent that there has been provided in accordance with this invention welding equipment and a welding method that achieve the aims and advantages specified herein. It will, of course, be understood that the forgoing description is of preferred exemplary embodiments of the invention and that the invention is not limited to the specific embodiments shown. Various changes and modifications will become apparent to those skilled in the art. All such changes and modifications are intended to be within the scope of this invention.

As used in this specification and appended claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A tooling cart for supporting a welding tooling module having a module latch member, said tooling cart comprising:
   a frame;
   a guide mounted to said frame to support the welding tooling module thereon; and
   a cart latch member supported by said frame and positioned for selective engagement with the module latch member when the welding tooling module is positioned on said guide, wherein the welding tooling module is secured to said tooling cart when said cart latch member and the module latch member are engaged.

2. A tooling cart as defined in claim 1 for use with a welding tooling module having a module latch member that includes a pin having a longitudinal axis and having an engagement recess for cooperation with said cart latch member, wherein said cart latch member includes a rod oriented transversely with respect to the longitudinal axis of the pin, said rod having a disengagement recess and being engaged with the pin in the engagement recess thereof, said rod being disengageable with respect to the pin when said disengagement recess of said rod is substantially adjacent the engagement recess of the pin.

3. A tooling cart as defined in claim 2, further comprising the welding tool module positioned on said tooling cart, wherein said module latch member and cart latch member together comprise parts of a tooling module latch that further includes:
   a block having a substantially vertically oriented passage therein for accepting one end of said pin and further having a transversely oriented passage therein for accepting one end of said rod; and
   a spring positioned between said block and a portion of said rod for biasing said rod towards a position in which said disengagement recess is not aligned with said vertically oriented passage;
   said rod having an opposite end for contacting a portion of a base operating machine as said tooling cart is brought into engagement with the base operating machine;
   wherein, when said tooling cart is connected to the base operating machine, said rod is displaced against the bias force of said spring to position said disengagement recess of said rod substantially adjacent said vertically oriented passage so as to permit insertion and removal of said pin from said block.

4. A tooling cart as defined in claim 1, further comprising:
   a reusable lower section including a base having a first plurality of locators thereon; and
   a removable upper section including a second plurality of locators for engaging said first plurality of locators of said base.

5. A tooling cart as defined in claim 1, further comprising at least one latch plate attached to said frame and comprising a part of a tooling cart latch that is used to latch said tooling cart to a welding machine.

6. A tooling cart, comprising:
   a reusable lower section including a base mounted on a set of wheels, said base having a first plurality of locators thereon; and
   a removable upper section including a frame having a plurality of frame members, said upper section further including rollers that support tooling being transported by said cart, wherein said upper section aligns with and fits over said locators such that said upper section can be removably attached to said lower section.

7. A tooling cart as defined in claim 6, wherein at least some of said frame members comprise vertically-extending tubular legs, and wherein said first plurality of locators align with and extend partially up into at least some of said tubular legs when said upper section is mounted on said lower section.

8. A tooling cart as defined in claim 6, wherein said tooling cart is adapted for supporting a welding tooling module having a module latch member, and wherein said tooling cart further comprises:

a guide mounted to said frame, said guide including said rollers which support the welding tooling module thereon; and a cart latch member supported by said frame and positioned for selective engagement with the module latch member when the welding tooling module is positioned on said guide, wherein the welding tooling module is secured to said tooling cart when said cart latch member and the module latch member are engaged.

9. A tooling cart as defined in claim 8 for use with a welding tooling module having a module latch member that includes a pin having a longitudinal axis and having an engagement recess for cooperation with said cart latch member, wherein said cart latch member includes a rod oriented transversely with respect to the longitudinal axis of the pin, said rod having a disengagement recess and being engaged with the pin in the engagement recess thereof, said rod being disengageable with respect to the pin when said disengagement recess of said rod is substantially adjacent the engagement recess of the pin.

10. A tooling cart as defined in claim 9, further comprising the welding tool module positioned on said tooling cart, wherein said module latch member and cart latch member together comprise parts of a tooling module latch that further includes:

a block having a substantially vertically oriented passage therein for accepting one end of said pin and further having a transversely oriented passage therein for accepting one end of said rod; and a spring positioned between said block and a portion of said rod for biasing said rod towards a position in which said disengagement recess is not aligned with said vertically oriented passage;

said rod having an opposite end for contacting a portion of a base operating machine as said tooling cart is brought into engagement with the base operating machine;

wherein, when said tooling cart is connected to the base operating machine, said rod is displaced against the bias force of said spring to position said disengagement recess of said rod substantially adjacent said vertically oriented passage so as to permit insertion and removal of said pin from said block.

* * * * *